May 27, 1969  L. WALSH ET AL  3,446,484
FAIL SAFE DEVICE FOR LOAD HOISTING EQUIPMENT
Filed Nov. 29, 1967  Sheet 1 of 3
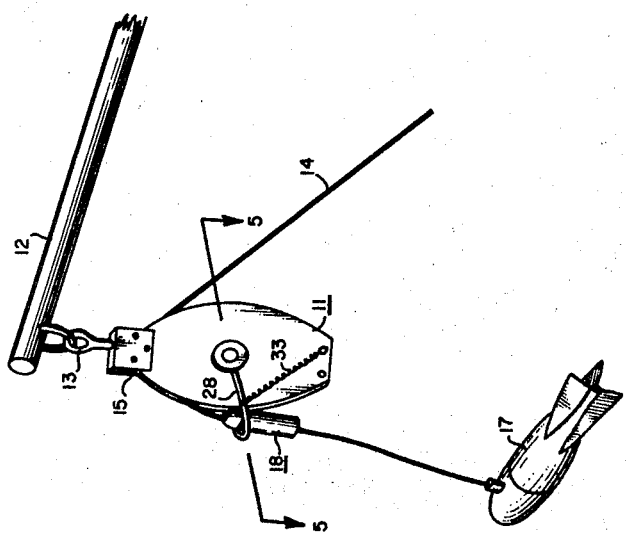
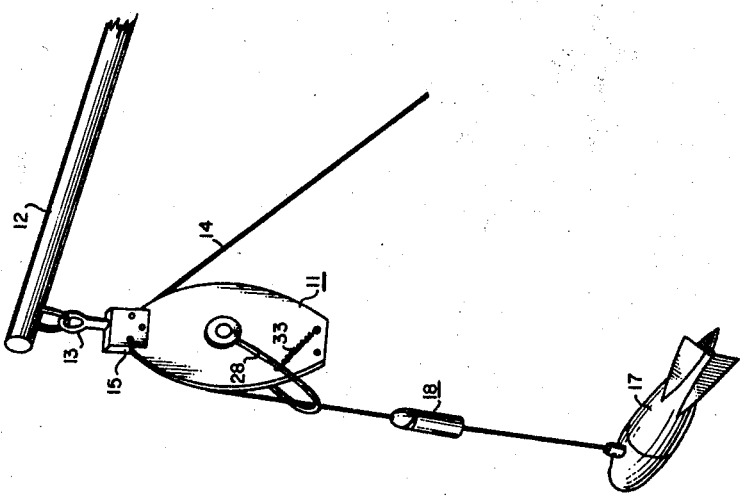
INVENTORS
*LEONARD WALSH*
*WILLIAM F. GRAVES*
BY
ATTORNEYS

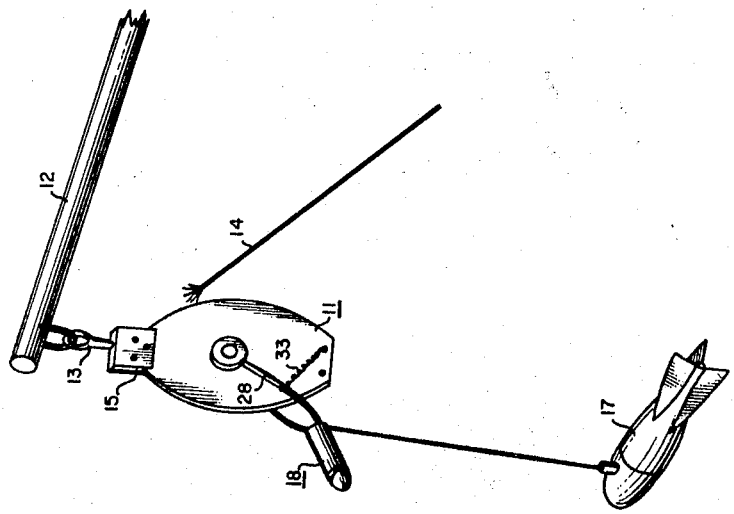
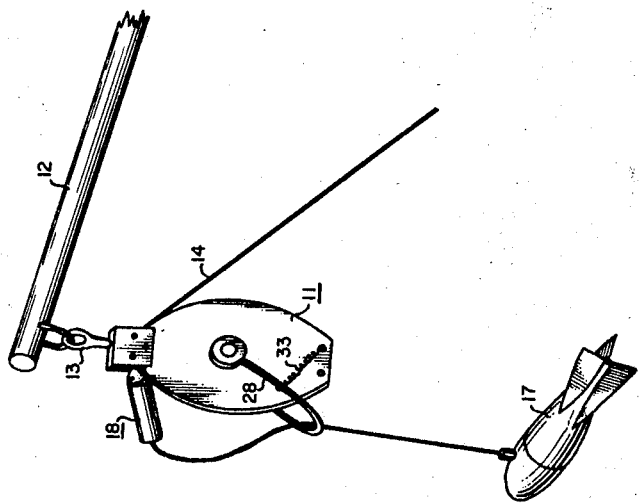

INVENTORS
LEONARD WALSH
WILLIAM F. GRAVES
BY
ATTORNEYS

United States Patent Office 3,446,484
Patented May 27, 1969

3,446,484
FAIL SAFE DEVICE FOR LOAD HOISTING EQUIPMENT
Leonard Walsh, Forestville, and William F. Graves, Suitland, Md., assignors to the United States of America as represented by the Secretary of the Navy
Filed Nov. 29, 1967, Ser. No. 686,394
Int. Cl. B66d 1/00, 1/48, 1/36
U.S. Cl. 254—135
8 Claims

ABSTRACT OF THE DISCLOSURE

A fail safe device for use with pulleys to eliminate danger to personnel and equipment if the cargo hook is drawn into eye of the pulley. A messenger which is attached to the cable a short distance ahead of the load, has a cutting mechanism to sever the cable when the messenger strikes the eye of the pulley. A catcher arm is mounted on the pulley to catch and retain the severed line.

---

The invention described herein may be manufactured and used by or for the Government of the United States of America for governmental purposes without the payment of any royalties thereon or therefor.

Background of the invention

The present invention relates to safety devices for use with power operated cargo hoisting equipment and particularly to devices which eliminate the hazards involved when the load hook is over-wound to the extent that it engages the eye of the pulley.

During the operation of power driven load hoisting equipment, the winch operator must control the upper limit of movement of the load hook to stop the hook before it is two-blocked, which is that condition which occurs when the hook is drawn into the eye of the pulley. If, through inadvertence or carelessness on the part of the winch operator, the load hook becomes two-blocked, then either of two results may occur. The line may break and the load is dropped or, if the line does not break, the overhead boom upon which the pulley is mounted will collapse and both the boom and the load will fall. When either of these results occur, the safety of personnel in the area is greatly endangered and the load being hoisted is usually damaged. If the hoisting operation is being conducted over the side of a vessel, such as when raising oceanographic research instrumentation, the instrument package is lost over the side of the vessel when the line parts upon two-blocking. In the past, various attempts have been made to prevent two-blocking by providing electrical switches which automatically control the extent to which a load may be hoisted. These switches operate to cut off the power to the winch when the load reaches a predetermined distance from the pulley. The electrical switches of this type have not been proven to be sufficiently reliable especially when used on shipboard load hoisting equipment where the switches are subjected to a corrosive salt spray which attacks the switch contacts and eventually renders the switch inoperative.

Summary of the invention

The general purpose of this invention is to provide a power driven load hoisting apparatus having a fail safe device incorporated therein to prevent loss of the load and collapse of the boom in the event that the load is two-blocked into the pulley. To attain this purpose, the present invention contemplates a messenger attached to the load line a short distance above the load for cooperation with a catcher arm or bail attached to the pulley cheeks, in such manner that, in the event that two-blocking occurs, the messenger will cut the line and will be caught then by the bail to prevent the load from falling.

An object of the invention is the provision of a device to protect equipment and personnel involved in the operation of power driven load hoisting equipment.

A further object of the present invention is the provision of a fail safe device for use with load hoisting equipment to prevent loss of the load in situations where the pulley becomes two-blocked.

Brief description of the drawings

FIGS. 1 through 4 are a series of perspective views of a preferred embodiment of the present invention showing a time sequence of the principles of operation of the invention.

Description of the preferred embodiment

Figure 5:
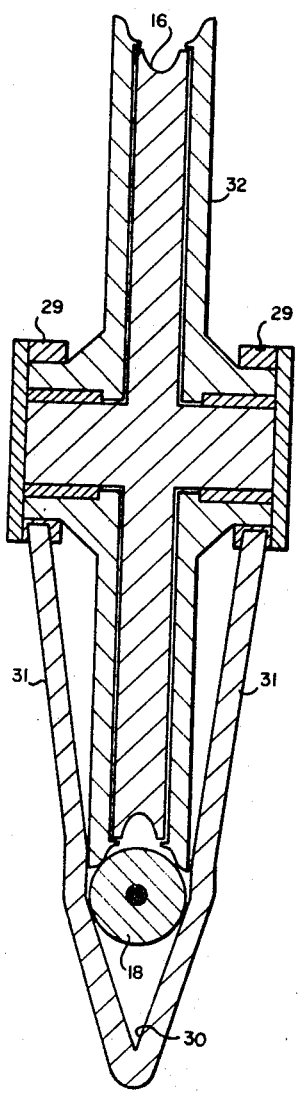
FIG. 5 is a sectional view of the invention taken along lines 5—5 on FIG. 2.

Referring now to the drawings, wherein like reference characters designate like or corresponding parts throughout the several views, there is shown in FIGS. 1 through 4 a single sheave pulley 11 attached to a boom 12 by means of shackles 13. A hauling line 14 is threaded through the eye 15 of the pulley and lies in the groove 16 of the pulley sheave in the usual manner. One end of the hauling line is operatively connected to a power operated winch, not shown, while the other line is adapted to hook onto a load 17, which in this case is shown to be an oceanographic instrument package, to raise and lower the load by selective operation of the winch. In oceanographic work, the hauline line 14 may be a multiconductor electrical cable which serves the two-fold purpose of supporting the instrument package 17 and telemetering the information to shipboard recorders. Fixedly secured to the hauling line a few feet above the instrument package is a messenger 18 the structural details of which are more readily seen in FIG. 6.

Figure 6:
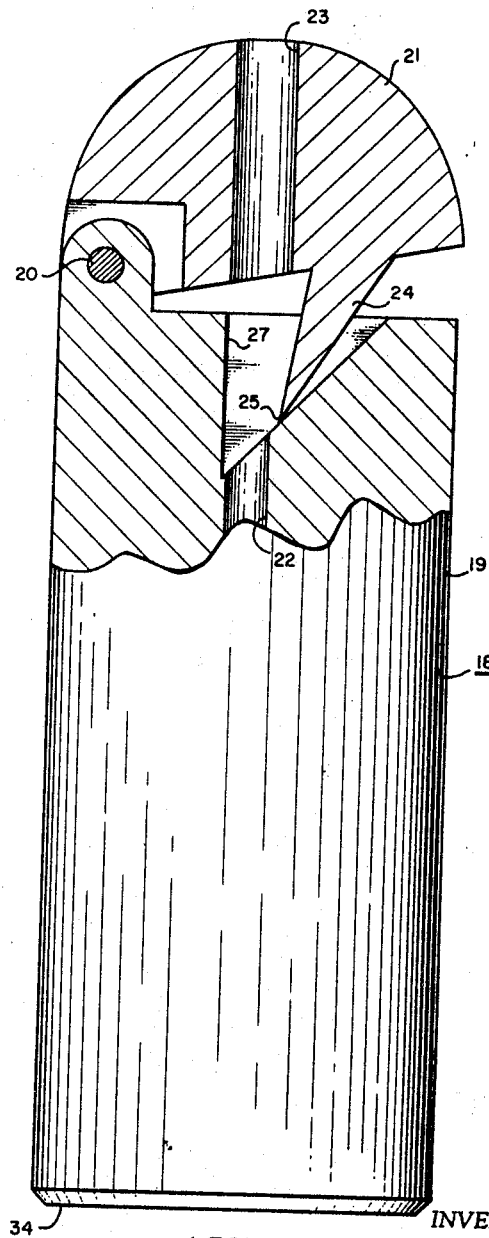
FIG. 6 is a perspective view, partially in section, of the messenger portion of the present invention.

Referring to FIG. 6, the messenger is shown as having a generally elongated cylindrical configuration and is comprised of a main body portion 19 and a rounded nose portion 21 which is pivotally mounted upon the upper end of the body portion by means of hinge 20. The messenger body member 19 and nose member 21 each have axial bores 22 and 23, respectively, extending therethrough and being of a diameter to receive the hauling line 14. The nose portion is mounted upon the body portion in such a manner that the axial bores 22 and 23 are in coaxial alignment. The body portion of the messenger is secured to the hauling line by any convenient means, such as by mechanical clamping device or providing a counter bore in the base of the body portion to receive a potting compound. As seen in FIG. 6, the upper surface of the nose member has a rounded configuration for reasons explained while the bottom surface is generally flat. Protruding from the flat lower surface of the nose member is a pair of spaced apart brackets 24, only one of which is visible in the drawing, for the purpose of supporting a cutter blade or knife 25. The upper portion of the messenger body member is provided with a wedge-shaped recess 26 to provide clearance for downward movement of the knife 25 against a wall 27 which defines a portion of the recess.

A substantially V-shaped bail 28 is pivotally mounted upon the pulley cheeks 32 by means of a pair of rings 29 or other suitable means. The bail is formed by a pair of arms 31 which diverge from an apex portion 30 of the bail. The rings are secured to the end portions of the diverging arms and slidably received upon pivot posts formed on the pulley cheeks. The V-shaped bail is so configured that its diverging arms 31 pass in close proximity to the periphery of the pulley cheeks but yet provide a small clearance therebetween so that the bail may pivot on the axis of the pulley or upon an axis parallel to the pulley axis. As seen in FIG. 1, a resilient spring or elastic cord 33 is attached at one end to the pulley cheek and has its other end connected to the bail to bias the bail toward the position shown in FIG. 1 wherein the closed end or apex of the bail is in engagement with the hauling line.

The operation of the present invention may best be visualized by reference to FIGS. 1–4 which illustrate the sequential operation of the device. FIG. 1 shows the hoisting equipment in the position occupied during normal operating conditions when the load has reached the upper limits of travel and movement of the load is terminated before the messenger is two-blocked. However, if the winch operator is inattentive or makes an error in judgement and the load is overwound, the messenger engages the bail and causes the bail to move to a horizontal position as shown in FIG. 2. With the bail in the retracted position shown in FIG. 1, the opening between the pulley and the apex of the bail is too small to permit the messenger to pass through that opening and therefore the nose of the messenger engages the bail to move it upward into the substantially horizontal position shown in FIG. 2. When the bail has been moved to the horizontal position, the opening between the bail and the pulley as seen by the messenger is increased to a size large enough to permit the messenger to pass therethrough. Continued winding of the winch will draw the messenger into engagement with the eye of the pulley, as shown in FIG. 3. After the messenger has passed through the bail, the elastic cord 33 attached to the bail causes the bail to return to its original retracted position thus reducing the size of the opening between the bail and the pulley to an area smaller than the cross section of the messenger. When the messenger strikes the eye of the pulley, the nose portion of the messenger is caused to pivot in a clockwise direction as seen in FIG. 6 and the knife is driven into and through the cable, thus severing the cable and continued winding of the winch pulls the cut end of the cable from the nose of the messenger and through the pulley relieving the tensile force on the pulley. The load and messenger remain connected together by the length of hauling line therebetween and this assembly is permitted to drop to the position shown in FIG. 4 whereupon the bottom surface portion 34 of the messenger engages the bail and the messenger is prevented from passing therethrough. The load is thereby suspended from the pulley by the messenger which is caught on the bail.

By providing a messenger on the cable to intentionally sever the hauling line when the load is overwound, there is no danger of two-blocking the load against the eye of the pulley which could collapse the boom and cause the load, pulley, shackles and boom to crash to the deck below. By also providing a resiliently biased bail on the bottom of the pulley for cooperation with the messenger, the bail catches the messenger after the cable is severed and supports the load to prevent the load from crashing to the deck or being lost over the side of the vessel. The device of this invention is of simple construction but yet is extremely reliable and therefore affords a degree of safety to personnel and equipment which heretofore had not been attained by previously known devices.

Obviously many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A fail safe mechanism for use of load hoisting equipment including a pulley and cable, the improvement comprising:
   a messenger adapted to be secured to a load hoisting cable for movement therewith,
   cutting means mounted upon said messenger for cutting said cable when the messenger engages a stationary member, and
   means for catching said messenger after the cable is severed by the cutting means.

2. The device of claim 1 wherein said messenger catching means is mounted upon said pulley.

3. The device of claim 1 wherein said messenger catching means comprises:
   a substantially V-shaped bail pivotally mounted upon said pulley for movement about an axis parallel to the pulley axis,
   said bail having a closed apex portion which together with the pulley defines an opening through which the cable and messenger may pass.

4. The device of claim 3 further comprising:
   resilient means mounted upon said pulley and being connected to said bail to resiliently bias said bail toward a first position wherein said opening is of a size to permit the cable to pass therethrough while preventing the messenger from passing therethrough,
   said bail being adapted to be moved to a second position by said messenger to permit movement of the messenger through said opening in an upward direction,
   whereby after movement of the messenger upwardly through said opening, the bail is returned to said first position by said resilient means to prevent movement of the messenger downwardly through said opening.

5. The device of claim 1 wherein said messenger includes a body portion adapted to be secured to a cable for movement therewith and a nose portion pivotally mounted upon said body,
   said cutting means being mounted upon said nose portion in such a manner as to sever the cable when the nose is pivotally moved upon abutting contact with a stationary member.

6. The device of claim 5 wherein:
   said body portion is substantially cylindrical in configuration,
   said nose portion has a substantially hemispherical configuration, and
   said nose and body portions having aligned through-apertures formed therein to receive said cable.

7. The device of claim 6 wherein:
   said cutting means comprises a knife blade mounted upon brackets which are downwardly depending upon the flat side of said substantially hemispherical nose portion,
   said knife blade being mounted in a position transverse to the through-apertures formed in said nose and body portions of the messenger.

8. The device of claim 6 wherein said nose portion is pivotally mounted upon an axis parallel to the knife edge and transverse to the through-apertures formed in said nose and body portions of the messenger.

References Cited

UNITED STATES PATENTS 2,045,533    6/1936    Smaltz _____ 254—135
3,240,474    3/1966    Garnier _____ 254—173

RICHARD E. AEGERTER, *Primary Examiner.*

H. C. HORNSBY, *Assistant Examiner.*

U.S. Cl. X.R.

30—175, 254—173, 190